US008767511B2

(12) United States Patent
Pennec et al.

(10) Patent No.: US 8,767,511 B2
(45) Date of Patent: Jul. 1, 2014

(54) METHOD FOR GLOBAL ACOUSTIC POSITIONING OF A MARINE OR SUBMARINE TARGET

(75) Inventors: Sébastien Pennec, Landerneau (FR); Pierre-Yves Morvan, Brest (FR)

(73) Assignee: Ixblue Industries SAS, Marly le Roi (FR)

( * ) Notice: Subject to any disclaimer, the term of this patent is extended or adjusted under 35 U.S.C. 154(b) by 0 days.

(21) Appl. No.: 13/452,373

(22) Filed: Apr. 20, 2012

(65) Prior Publication Data
US 2013/0128700 A1    May 23, 2013

(30) Foreign Application Priority Data

Apr. 21, 2011 (FR) .................................... 11 01255

(51) Int. Cl.
*G01S 3/808*    (2006.01)
(52) U.S. Cl.
USPC ........................................................ 367/128
(58) Field of Classification Search
USPC .................................. 367/128, 127
See application file for complete search history.

(56) References Cited

U.S. PATENT DOCUMENTS

| 2006/0178829 | A1 | 8/2006 | Gaiffe |
| 2009/0141591 | A1* | 6/2009 | Basilico .................... 367/128 |
| 2009/0175128 | A1 | 7/2009 | Jean et al. |
| 2009/0196122 | A1* | 8/2009 | Crowell .................... 367/127 |

OTHER PUBLICATIONS

Francois P. Parthiot, et al., "A Better Way to Navigate on Deep Sea Floors", Oceans 93 : Engineering in Harmony with Ocean, Oct. 18, 1993, pp. II-494-II-498, IEEE, New York, NY, USA, XP010117558.
Thomas C. Austin, et al., ""RATS", A Relative Acoustic Tracking System Developed for Deep Ocean Navigation", Oceans 97 : MTS/IEEE Conference Proceedings Halifax, Oct. 6, 1997, pp. 535-540, vol. 1, IEEE, New York, NY, USA, XP010246302.

* cited by examiner

*Primary Examiner* — Daniel Pihulic
(74) *Attorney, Agent, or Firm* — Baker & Hostetler LLP

(57) ABSTRACT

A method for the global acoustic positioning of the USBL or SBL type of a marine or submarine target is more accurate than the method used by known USBL or SBL systems, while applying a network of sensors having the same material dimensions as those of these known systems. The method makes use of the movements of the network of sensors to apply principles of the processings by synthetic antenna. The principle of the synthetic antenna transposed to the present problem consists in using the signals received by the hydrophones of a physical antenna placed on a moveable platform at K different moments in succession, and therefore at K locations in succession in order to provide an estimate of the position of the beacon by virtue of an antenna of virtually greater dimensions.

6 Claims, 2 Drawing Sheets

METHOD FOR GLOBAL ACOUSTIC POSITIONING OF A MARINE OR SUBMARINE TARGET

CROSS-REFERENCE TO RELATED APPLICATION

This application claims priority to foreign French patent application No. FR 1101255, filed on Apr. 21, 2011, the disclosure of which is incorporated by reference in its entirety.

FIELD OF THE INVENTION

The present invention relates to the acoustic positioning systems for a beacon placed on a marine or submarine target and to their operation.

BACKGROUND

An acoustic positioning system is used to establish the georeferenced and instantaneous absolute position of a fixed or mobile beacon. Amongst the known global acoustic positioning systems, the systems that are known as Ultra Short Baseline—USBL and the systems known as Short Baseline—SBL usually comprise a network of N acoustic sensors or hydrophones placed in a 2D or 3D antenna structure. This antenna is used to determine the relative position of a sound source or beacon emitting a deterministic acoustic signature. The measurement of the travelling times of the sound wave from the source to the sensors (TOA—Time Of Arrival) and/or the measurement of phase (POA—Phase Of Arrival) make it possible to determine the relative position of the beacon. The use of an attitude unit (supplying the parameters: Roll (R), Yaw (L), and Pitch (T)), compensating for the effects of the movements of the antenna on the positioning, associated with an item of georeferencing information (GPS—Global Positioning System), makes it possible to determine the absolute position of the beacon. The positioning cycle, called recurrence, is reiterated periodically to provide each time a new estimate of the absolute position of the beacon. French Patent 2.851.340 proposes a global positioning system of the USBL type. The accuracy of the USBL systems (and that of the SBL systems) is partly dependent on the dimension of the antenna structure. The typical distance between the sensors of the antenna is less than or equal to 0.5 m in the context of the USBL and is greater than a meter in the context of the SBL. The accuracy of a positioning antenna of this type is defined as follows:

$$\sigma_\theta = \frac{\lambda}{d\pi\cos(\theta)\sqrt{2\eta}} \qquad 1\text{-}1$$

In this formula, $\lambda$ is the wavelength defined as the ratio between the velocity c in the water layer of the antenna and the carrier frequency $F_0$. The angle of incidence of the sound wave e on the antenna, the signal-to-noise ratio $\eta$ and the distance d between the sensors determine the accuracy of positioning of the USBL system. In addition to the environmental parameters (noise level, velocity, etc.) and the application parameters (signal level, carrier frequency, angle of incidence, etc.), the dimension of the antenna determines the accuracy of the positioning system.

SUMMARY OF THE INVENTION

The subject of the present invention is a method for global acoustic positioning of the USBL or SBL type having better accuracy than the conventional systems by exploiting the successive movements of the network of sensors.

According to the invention, the method for the global acoustic positioning of a transponder placed on a marine or submarine target is characterized by a 2D or 3D acoustic antenna comprising a network of N sensors of the USBL or SBL type placed on a moveable floating or submarine platform; an inertial navigation system (INS) capable of measuring the position and orientation information of the platform; a GPS receiver capable of supplying the georeferenced coordinates of the platform on the surface; a Doppler velocity log (DVL) capable of supplying the information of speed of the submarine platform; and a computer. The positioning system according to the invention is characterized in that on the surface, the GPS receiver supplies the inertial navigation system with georeferenced coordinates in order to correct the drift of the latter. Beneath the surface, since it is not possible to receive the GPS signal, the inertial navigation system is adjusted by the speed information supplied by the DVL, said inertial navigation system supplying the information concerning orientation and movement of the platform on which the network of N acoustic sensors is placed to make it possible to make use of the principle of processings by synthetic antennas. According to this principle, the K acoustic responses of the beacon are received by the acoustic antenna placed on the moveable platform at K different moments in succession, and therefore at K locations in succession. The K positions, movements and orientations of the network of N acoustic sensors placed on the platform are measured by virtue of the inertial navigation system. On the basis of this information, the synthetic processing incorporated into the computer makes it possible to reconstruct, from one to the next, an acoustic antenna of a greater dimension than the conventional antenna by virtue of which the position of the beacon is estimated. The accuracy obtained by means of the synthetic antenna corresponds to that of a conventional antenna, the dimension of which would be similar to the distance traveled during the K successive receptions of the signal from the beacon. The deficiency in accuracy associated with the initial dimension of the network of N acoustic sensors of the USBL or SBL type is alleviated by the use of the synthetic processing on the K acoustic receptions.

BRIEF DESCRIPTION OF THE DRAWINGS

The present invention will be better understood on reading the detailed description of one embodiment, taken as a non-limiting example and illustrated by the appended drawing in which.

DETAILED DESCRIPTION

The present invention will be described below with reference to a global positioning antenna of the USBL type with 2D geometry consisting of four hydrophones, but it is clearly understood that the invention is not limited solely to this example and that it may be applied with antennas consisting of two or more hydrophones having 2D or 3D antenna structures but also to positioning systems of SBL type. In the example described below, this antenna is placed on a moveable marine platform.

Figure 1:
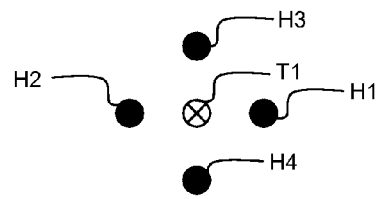
FIG. 1 represents a simplified schematic view from above of the network of sensors of a known physical antenna for a USBL or SBL global positioning system.
Figure 2:
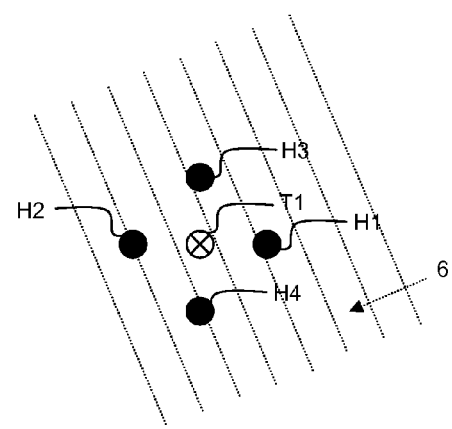
FIG. 2 represents an acoustic wave front reaching the network of N constituent sensors of the USBL or SBL system.
Figure 3:
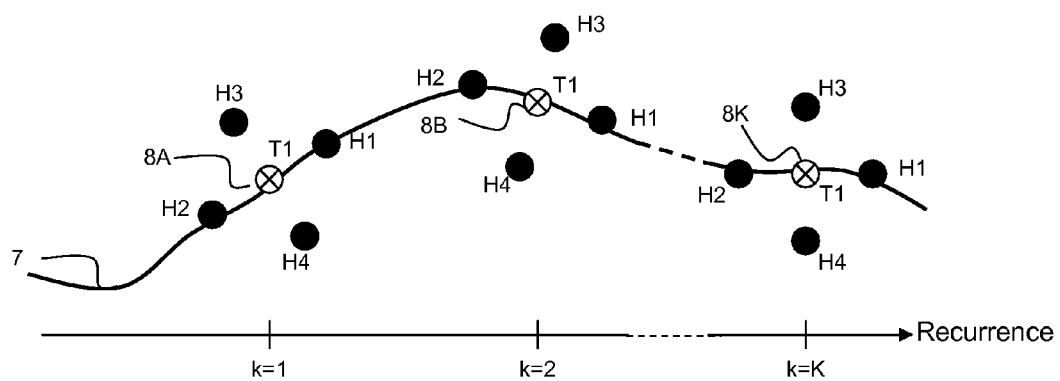
FIG. 3 represents schematically the movements of the physical antenna based on which the synthetic antenna according to the invention is reconstructed.
Figure 4:
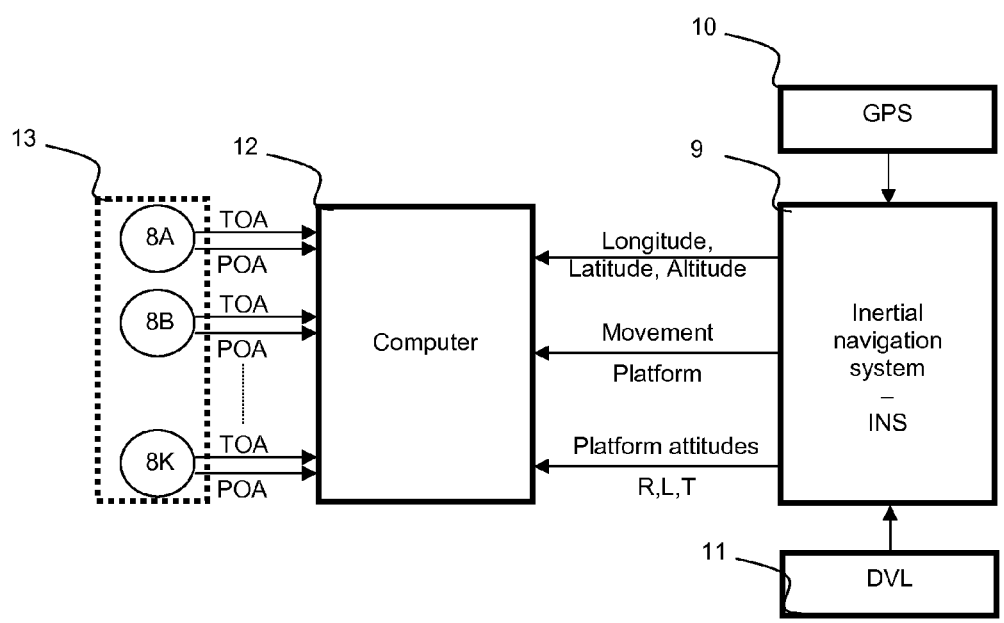
FIG. 4 is a block diagram of the systems and of the functions used by the invention to produce an estimate of the position of a beacon.

Shown schematically in FIGS. 1 and 2 is the network of four hydrophones forming the USBL or SBL antenna in the absence (FIG. 1) and in the presence (FIG. 2) of the wave front emitted by the beacon to be positioned. FIG. 3 shows the movement of the various sensors that form the network of elementary sensors during K successive recurrences. FIG. 4 shows schematically the data transfers between the elements that form the positioning system.

The global positioning system according to the invention is shown schematically in FIG. 1. The USBL positioning antenna consists of an emitter or projector (T1) making it possible to interrogate a beacon (not shown) by emitting, for example, a broadband signal at a frequency of between 5000 Hz and 100 000 Hz with a period, for example, of 1 second or approximately 3 seconds. Associated with this emitter is a network of four reception hydrophones (H1), (H2), (H3), (H4) forming the acoustic antenna operating in a range of frequencies of between 5000 Hz and 100 000 Hz. The assembly is placed on a moveable floating or submarine platform (not shown).

During a positioning cycle shown in FIG. 2, the sound signal emitted by the beacon (not shown) following its interrogation by the projector T1 of the antenna reaches the network of sensors H1 to H4. The wave front (6) which reaches the reception antenna is that from which the measurements of TOA and/or of POA of the sound wave on the various sensors of the antenna will be deduced. This TOA and/or POA information, associated with the knowledge of the distance between the various hydrophones forming the network of sensors, make it possible to work back to an estimate of the relative position of the beacon. The accuracy associated with this estimate is dependent on environmental parameters such as the signal-to-noise ratio and on systems parameters such as the frequency of the sound waves used and the distance between the elements comprising the network of sensors. It is known that the absolute position of the beacon may be deduced from the relative position by exploiting the information concerning the attitude of the platform R, L, T and the georeferenced position (Longitude, Latitude, Altitude) supplied by the inertial navigation system. On each cycle or acoustic recurrence new estimates of relative and absolute positions of the transponder are produced. The estimated positions are produced independently of one another.

FIG. 3 shows the movements at a speed of less than 6 knots of the moveable platform at K different moments in succession, at K successive locations (8A to 8K) on a trajectory (7). The network of sensors forming the acoustic antenna, being secured to this platform, experiences the same movements. For each of K moments and locations in succession, the positioning antenna receives the wave emitted by the fixed beacon during the acoustic recurrences. The method of the invention consists in exploiting the movements of the platform and therefore of the acoustic antenna in order to alleviate the relatively poor positioning accuracy due to the short distance between the sensors comprising the network of hydrophones. The synthetic-antenna processings applied in the context of the positioning according to the invention make use of the information supplied by the inertial navigation system in order to estimate the movement of the network of hydrophones on each reception of the sound wave. The inertial navigation system adjusted by the positional information supplied by the GPS and/or by the information on instantaneous speed supplied by the DVL makes it possible to ascertain exactly the distances traveled by the network of sensors between the K receptions of the signal emitted by the transponder. Knowing the movement of the receiver makes it possible to form a network of hydrophones, the number of which and the distance of which between sensors are advantageously greater than those of the elementary network of FIG. 1. This synthetic or virtual network of sensors obtained from the K positions associated with the acoustic TOA and/or POA information and with the attitudes of the elementary antenna (R, L, T) during the K recurrences makes it possible to provide an estimate of the relative and absolute positions of the transponder. The positioning accuracy obtained by the network of sensors resulting from the combination of the successive K acoustic recurrences is increased according to the definition of the accuracy of the USBLs evoked in Equation 1-1 above.

Shown in FIG. 4 are the various items of equipment that are used in the positioning system and the flows of data between the items of equipment. The inertial navigation system (9) receives the georeferencing information from the GPS (10) and/or the instantaneous speed information from the DVL (11) to reduce its drift. The inertial navigation system transmits at a high rate (for example 100 Hz) to the computer (12) the navigation information (longitude, latitude, altitude), the movement information and the attitudes information (R, L, T). The computer also receives the TOA and POA information derived from the detection of the acoustic signal (13) on the network of sensors. Finally, the computer determines the relative and absolute position of the transponder based on the information originating from the successive recurrences K.

The value of the construction of a synthetic antenna in the context of the USBL or SBL positioning systems is to accumulate the advantages of accuracy associated with a large-dimension antenna while retaining the advantages of small bulk and of portability of the conventional system. The advantages are, in particular:

A positioning accuracy that is much better (for example by a factor of 3) than that of a conventional USBL or SBL system because of the increased size of the network of sensors associated with the movement of the platform.

A robustness of positioning because the exploitation of K positioning cycles makes it possible to provide an estimate of the position of the beacon even if N−1 of the N sensors of the elementary network do not detect the signal emitted by the beacon. With the conventional USBL or SBL systems, it is necessary to detect the signal emitted by the beacon on a minimum of 3 hydrophones in order to provide a relative and absolute position of the beacon. In the presence of considerable noise or when certain hydrophones are lacking, estimating the position of the transponder is impossible. Exploiting the movements of the network of sensors makes it possible to provide an estimate of the position of the transponder even though only one hydrophone detects the signal in the course of the K recurrences.

Retaining the small bulk and ease of deployment permitted by the USBL or SBL antenna because the increase in the dimension of the network of sensors is obtained by combination of the acoustic recurrences.

The invention claimed is:
1. A method for global acoustic positioning of a marine or submarine target using a global positioning antenna of the USBL or SBL type, the global positioning antenna placed on a moveable floating platform and comprising an emitting acoustic transducer, at least two acoustic sensors, an inertial navigation system with a GPS system or a Doppler velocity log DVL, and a computer, the method comprising:
operating acoustic recurrences in succession at successive locations, each acoustic recurrence being operated by:
emitting, by the emitting acoustic transducer, one acoustic pulse to interrogate a beacon placed on the marine or submarine target, and
receiving, by the at least two acoustic sensors, a reflection of the emitted acoustic pulse;
obtaining a synthetic network of acoustic sensors at the successive locations; and
determining, based on the synthetic network of acoustic sensors at the successive locations, a single georeferenced position of the beacon.

2. The method according to claim 1, wherein the emitting acoustic transducer and the at least two acoustic sensors operate at a frequency between 5 and 100 kHz, and wherein the period of acoustic recurrences of the acoustic pulses emitted by the emitting acoustic transducer is 3 seconds.

3. The method according to claim 1, further comprising, measuring, for each acoustic recurrence, a time of arrival or a phase of arrival of the reflection of the emitted acoustic pulse from the beacon.

4. The method according to claim 1, further comprising estimating, by the inertial navigation system, movements and orientations of the moveable floating platform during the acoustic recurrences.

5. The method according to claim 4, wherein the movements and the orientations of the moveable floating platform are used by the computer to determine the synthetic network of acoustic sensors.

6. The method according to claim 3, wherein the single georeferenced position is determined by estimating relative and absolute positions of the marine or submarine target using the times of arrival and the phases of arrival of the reflections of the emitted acoustic pulse from the beacon.

* * * * *